April 9, 1946.   A. W. GELPCKE   2,398,220
TOGGLE LOCK
Filed Nov. 28, 1944   3 Sheets-Sheet 1
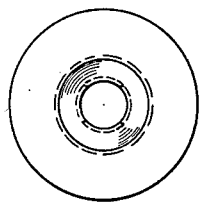
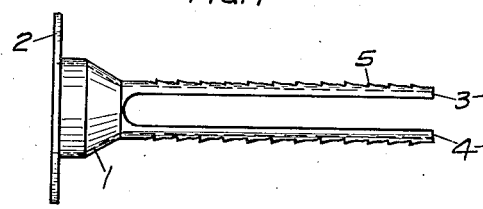
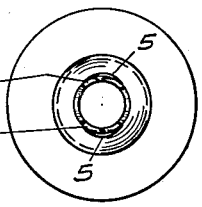
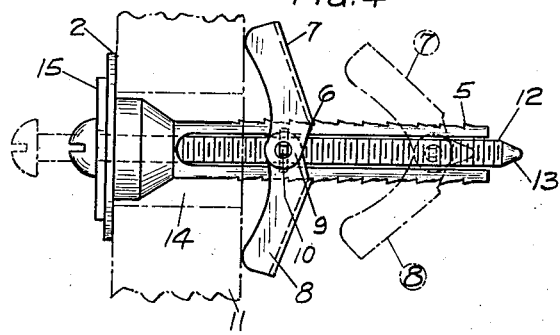
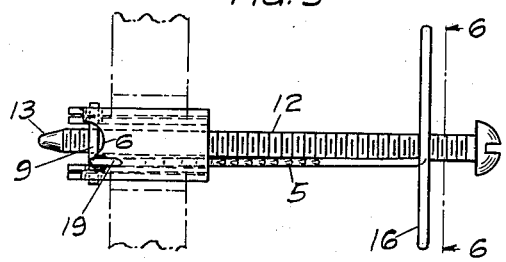
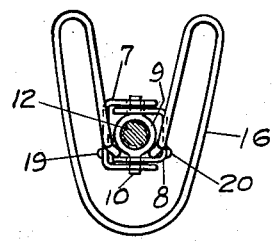
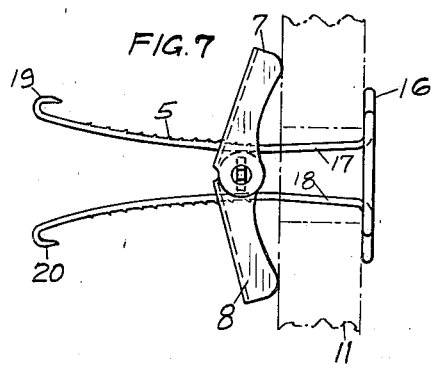
INVENTOR.
ALFRED W. GELPCKE
BY A. D. T. Libby
Attorney

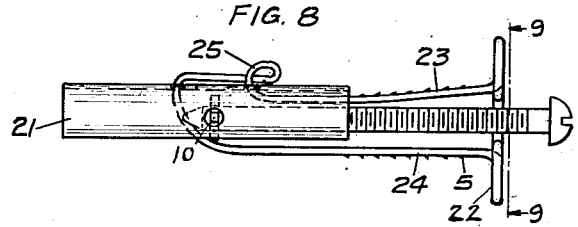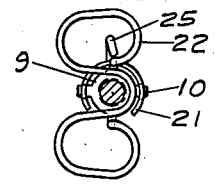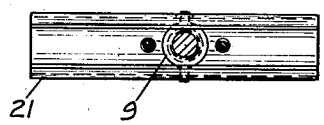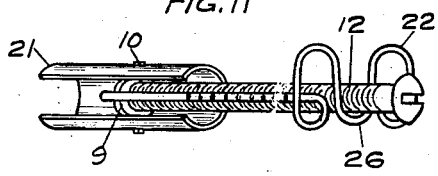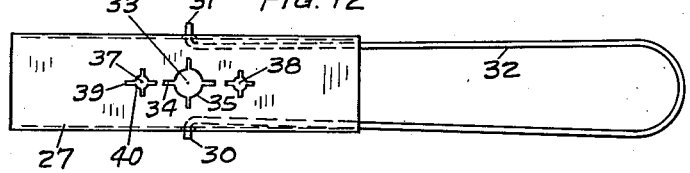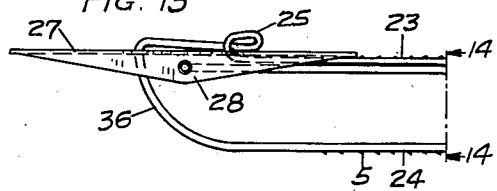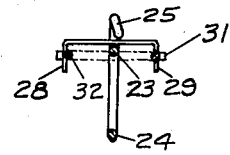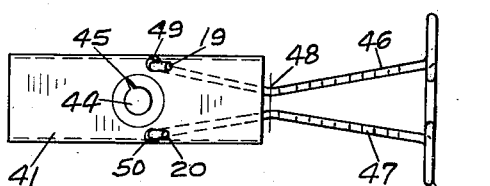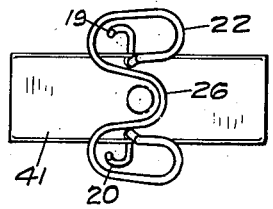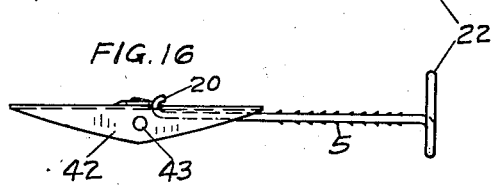

April 9, 1946. A. W. GELPCKE 2,398,220
TOGGLE LOCK
Filed Nov. 28, 1944 3 Sheets-Sheet 3

INVENTOR.
ALFRED W. GELPCKE
BY
A. D. T. Libby
Attorney

Patented Apr. 9, 1946

2,398,220

UNITED STATES PATENT OFFICE 2,398,220

TOGGLE LOCK

Alfred W. Gelpcke, Brooklyn, N. Y., assignor to The Rawlplug Company, Inc., New York, N. Y.

Application November 28, 1944, Serial No. 565,453

13 Claims. (Cl. 85—3)

This invention relates to a new type of toggle lock for use in connection with a threaded bolt or stud used for holding devices or objects to hollow masonry, hollow tile, cinder blocks, plaster walls, fibre or glass-wool wall boards and the like. Heretofore, it has been the practice to drill holes in the structures mentioned and then pass through some part of the object that is to be fastened to the structure, toggle bolts which are then inserted through the holes in the said structures, these toggle bolts being provided with transverse members usually referred to in the trade as toggle wings.

The toggle structure is provided with springs which either move the wings transversely to the bolt after they pass through the hole in the structure or, if but one wing is used, this is mounted eccentrically on the bolt so that it will tip by gravity into a transverse position so as to engage the inner surface of the structure as the bolt is tightened up. There is no way of locking these toggles or toggle wings into position; consequently, if it is found necessary to take down the device being held by the bolts for any purpose, the toggle arms or wings drop down into the hollow structure and become lost.

It is therefore the principal object of my invention to provide a toggle lock which can be fastened to the hidden wall of the structure entirely independent of and before the device to be fastened in place is attached thereto. This makes it very much easier to fasten the device to said structures, and if the device is ever taken down, the toggle lock still remains in place, or it may be removed and used elsewhere if the device is not to be returned to the same place.

Another object of my invention is to provide a toggle which will attain the principal object and yet one that is cheap to manufacture.

Other objects will appear from a study of the following specification, taken in connection with the annexed drawings wherein:

Figure 1 is a side elevation of one form of guide member to be used with my improved type of lock.

Figure 2 is a view of Figure 1 looking from left to right.

Figure 3 is a view of Figure 1 looking from right to left.

Figure 4 shows the guide member of Figure 1 associated with a present-day type of toggle head having a pair of wings, the same being shown in two positions of operation.

Figure 5 is a view showing a modified form of guide means in association with a toggle head of the type shown in Figure 4, as the device is being inserted through a hole in the supporting structure.

Figure 6 is a view of the device per se looking from right to left of Figure 5, on the line 6—6.

Figure 7 is a view of the toggle unit of Figure 5 completely installed in holding position.

Figure 8 is a side view of a modified form of guide and toggle lock member, the toggle head being in a position parallel to the assembly bolt and ready for insertion into the hole in the supporting structure.

Figure 9 is a view of Figure 8 looking from right to left, on the line 9—9.

Figure 10 is a view of the toggle head of Figure 8 with the guide arms and assembly bolt shown in section.

Figure 11 is a perspective view of the structure of Figure 8, ready for assembly in the hole in the supporting structure.

Figure 12 is a plan view of a further modified form of toggle lock or head with an installation tool applied thereto.

Figure 13 is a side view of the toggle head of Figure 12 with the support and guide arms in position, together with the installation tool, the guide arms and installation tool being cut off on the section line 14—14.

Figure 14 is a view on the line 14—14 of Figure 13.

Figure 15 is a plan view of a further modified form of guide member with the toggle lock or head carried thereby in position to be inserted in a hole or through the support structure.

Figure 16 is a side view of Figure 15.

Figure 17 is an end view of Figure 15 looking from right to left.

Figure 18:
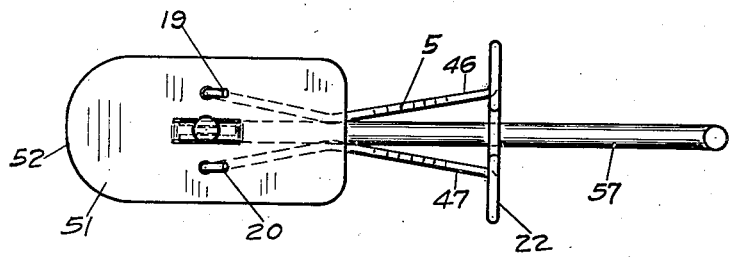
Figure 18 is a plan view of a further modified form of structure showing a different type of installation tool.

Referring now to the details wherein like numbers refer to corresponding parts in the various views, 1 is a guide member having a stop portion in the form of a flange 2 and a pair of extended arms 3 and 4. These arms preferably have considerable resilience and are preferably provided with barbs 5 or corrugations which are adapted to engage sharp-edged shoulders 6 on a toggle lock or head having wings 7 and 8. This particular type of toggle head is an old structure being provided with a nut 9 having pivot studs 10. In the assembly of this device to the supporting wall 11, shown in dotted lines, the toggle head is mounted on a threaded stud 12 which preferably has a pointed end 13 for making easy entry into the nut 9; and the wings 7 and 8 are moved together and the whole inserted through the hole 14 so that the flange 2 comes against the support structure 11. Then, on pulling outwardly on the assembly stud 12, the toggle wings are drawn into the position shown in full lines in Figure 4 so the edge 6 engages the cooperating barb 5 or equivalent, thereby holding the toggle wings 7 and 8 in locked position. The resilience of the arms 3 and 4, which are formed to have a tendency to move apart, also assists in establishing this lock between the arms 3 and 4 and the toggle wings 7 and 8. After the structure has been thus installed, the assembly screw 12 and its accompanying washer 15 may be unscrewed from the nut 9, thereby leaving the toggle assembly locked in position in the supporting structure ready to receive a holding bolt for fastening any device to the supporting structure 11.

In Figure 5, the guide member has a stop portion 16 with integral arms 17 and 18, all being formed from a piece of metal wire having considerable resilience. The guide arms 17 and 18 are shown in association with toggle wings 7 and 8 similar to those shown in Figure 4, except that they have slots along one side intercepting the locking shoulders 6 to allow the ends of the arms 17 and 18 to be passed therethrough and then bent over at 19 and 20.

As will be seen from Figure 7, the arms 17 and 18 are formed in a diverging manner so that when the wings 7 and 8 are drawn up by the assembly bolt 12, as described with respect to Figure 4, the arms 17 and 18 spread and thereby cause the barbs 5 thereon to be gripped by the material at the end of the slots within which the arms 17 and 18 are positioned. After the device has been installed as shown in Figure 7, the installing or assembly bolt 12 is withdrawn ready to receive the holding bolt which will engage the nut 9 as heretofore described with respect to the construction of Figure 4. It may be mentioned that if, for any reason, it is desired to remove the toggle mechanism the same may be done by inserting the assembly bolt 12 and forcing the wings backwardly until the hooked ends 19 and 20 engage the inner surface of the slot, thereby moving the wings 7 and 8 into closed position as shown in Figure 5. Then, by taking hold of the stop portion 16, the whole device may be withdrawn from the mounting structure.

In Figure 8 the toggle head or lock 21 is made like a half-cylinder with a nut 9 pivoted therein, while the guide member has a stop portion 22 formed in a somewhat different manner than that of 16 of Figure 6, but having integral arms 23 and 24 with barbs 5 or other suitable formations made thereon. In the formation of the guide member, a loop 25 is formed therein to act as a stop for the toggle head 21 when it is moved into the position of Figures 8 and 11 for insertion through a hole in the support structure. The head 21 may be swung or tilted into a position substantially parallel with the arms 23 and 24 by the assembly bolt 12 as shown in Figure 11 when the device is ready to be inserted into the hole in the support structure.

It will be noted from Figure 11 that the guide stop portion 22 is so formed with a loop 26 as to act as a guide for the holding bolt when this is inserted after the device has been installed in a support structure. The installation of this particular device is similar to that described with respect to Figures 5 to 7 inclusive.

In Figure 12 the toggle head 27 is made of sheet metal with oppositely disposed side flanges 28 and 29. Each of these flanges have holes therein to receive the ends 30 and 31 of an installation tool 32, the resilient arms of which can be pushed together so as to snap the ends 30 and 31 into the said holes. The head 27 has an orifice 33 to receive a holding screw, the metal being slitted at a plurality of places 34 so the sectors 35 have considerable spring action to securely grip the threads on the holding bolt. The head 27 is carried by a guide member 36 substantially the same as shown in Figure 8, holes 37 and 38 being provided to receive the arms 23 and 24 of the guide member. The material around the holes 37 and 38 may be slitted at 39 to give some resilience to the sectors 40 forming the periphery of the holes 37 and 38.

After the guide member 36 and the head 27 have been assembled, the installing tool 32 may be put in place as indicated in Figure 12 and as described, and the device inserted through a hole in the supporting structure. Then, by means of the assembly tool 32, the head 27 is pulled back against the inner wall of the support member and becomes locked in operative position on the barbs 5 or equivalent formations, after which the assembly tool 32 may be removed.

In Figures 15, 16 and 17, the toggle head 41 is quite similar to the head 27 of Figure 12, having side flanges 42 with holes 43 therein to receive the assembly tool 32. However, in this form, the head 41 has the metal around the screw hole 44 for the holding bolt punched outwardly and slitted at 45 to give resilient gripping action on the holding bolt. Furthermore, the guide and support member carrying the head 41 has a stop portion 22 as shown in Figure 9, but its arms 46 and 47 are formed in a reverse taper from the plane 48, and the outer ends of the arms, after passing through holes 49 and 50 in the head 41, are bent over into hook shape similar to the hooks 19 and 20 in Figure 7.

In this form of construction, when the toggle head 41 is moved into the position shown in Figures 15 and 16 for insertion into the hole in the support structure, considerable tension is applied to the arms 46 and 47 so that when the tool 32 is pulled outwardly, the arms 46 and 47 help move the toggle head 41 into a vertical position and the tool 32 then draws the head against the inner wall of the support structure, where it is held by the barbs 5 or equivalent formation. It is to be understood that the plane 48 is located a little distance beyond the inner surface of the support structure so that when the tool 32 pulls the toggle head 41 there-against the member is drawn up against the tapering arms 46 and 47 which further assist in locking the head securely in operative position.

Figure 19:
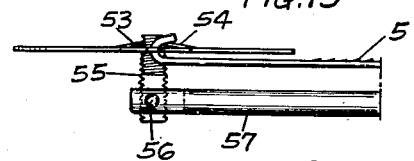
Figure 19 is a side elevation of Figure 18.
Figure 20:
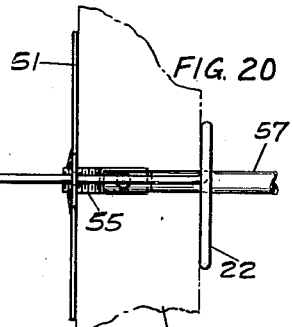
Figure 20 is a view of the structure of Figure 18 about as it would be after being installed on a support structure.

In Figures 18 to 20 inclusive, the toggle head 51 is a flat plate preferably with a rounded end 52 for a purpose which will be immediately pointed out. The hole for the holding bolt may be made in any satisfactory manner as by punching outwardly prongs 53 and 54 which are adapted to engage the threads of a stud 55 pivoted at 56 to an assembly bolt 57, thereby forming a threaded movable end on this bolt. A guide and support member is used with the head 51 the same as shown in Figure 15. In installing this device, and assuming that the head 51 has been assembled to the arms of the guide and support member, the assembly bolt 57 with the stud 55 is screwed into the toggle head 51 and then the head is pushed outwardly on the arms of the guide and support member so that the parts take the position as shown in Figures 18 and 19. The device is then pushed through a prepared hole in the support structure. After the head 51 clears the hole, the assembly bolt 57 is pulled outwardly and the head 51 is drawn into the position shown in Figure 20 against the inner wall of the support structure where it is retained in the same manner as described with respect to the head 41 of Figure 15. Then the assembly bolt 57 is unscrewed, ready to receive a holding bolt.

Figure 21:
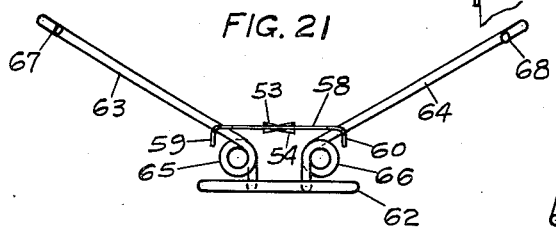
Figure 21 is a plan view of a further modified form of toggle lock structure.
Figure 23:
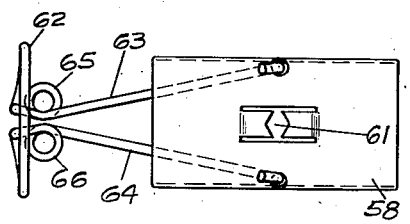
Figure 23 is a plan view of Figure 21 with the toggle lock or head in position to be inserted through the support structure or hole therein.
Figure 22:
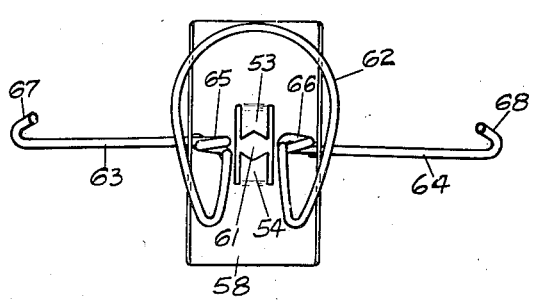
Figure 22 is an end view of Figure 21.

In Figures 21 to 23 inclusive, the toggle head 58 is somewhat similar to the toggle head 41 in that it is made out of a piece of sheet metal having side flanges 59 and 60 and a hole 61 formed therein by punching out the portions 53 and 54 in a similar manner as shown in Figure 19. The guide and support member has a stop formation 62 somewhat differently formed than shown in the previous figures, and its arms 63 and 64 have loops 65 and 66, respectively, formed closely adjacent the stop formation 62, whereby the arms 63 and 64 are positioned at a wide angle as shown in Figure 21, so that after the toggle head 58 has been assembled and the outer extremities of the arms 63 and 64 are bent into hooks 67 and 68, the toggle head 58 is forced by the great resilience of the arms 63 and 64 into the position approximately as shown in Figure 21. In utilizing this form, the arms 63 and 64 are forced toward each other and the toggle head 58 is moved outwardly thereon and tilted into the position as shown in Figures 23, after which the toggle head 58 is inserted through the hole prepared for it. Immediately it passes through the hole, the great resilience of the arms 63 and 64 forces it back and holds it in locked position against the inner wall of the support structure so that no barbs or their equivalent are necessary on these guide arms.

With the constructions shown in Figures 12, 15, 18 and 23, the toggle heads thereof may be pushed through such material as glass-wool impregnated wall board without being obliged to drill or cut a hole therethrough, and that is why the form shown in Figure 18 has the rounded end 52 as this particular type of toggle head is wider than the forms shown in Figures 12, 15 and 23.

It will be noted that where the guide and support member is made out of one piece of wire having considerable resilience, such, for example, as spring wire, it is formed as has been said with a stop portion 22 to serve the same function as the flange 2 of Figure 1, whereby the guide member cannot be pushed through the hole in the support structure.

I believe I am the first to design a toggle lock which may be installed prior to the installation of the device that is to be mounted on a hollow support structure, and it will be readily understood by an inspection of the drawings, taken with this specification, that many of the details may be varied over considerable range without departing from the spirit of my invention or the scope of the appended claims; for example, the loops 65 and 66 on the construction shown in Figures 21-23 are not absolutely essential to produce the necessary resilience in the arms 63 and 64, especially when the guide and support structure is made of spring-acting material.

It is to be understood that the stop formation, as well as the corresponding stop member 22 in the construction of Figures 5 to 20 inclusive, are so made that they will maintain a tension on the arms forming the guides for the toggle head in such a manner as to accentuate the return movement of the toggle head after it has been passed through the wall of the support structure, so that in certain installations an insertion tool is not required but is only necessary where very thick structures, having deep holes, are encountered and where longer guide arms are needed; or for hollow structures having irregular surfaces on the reverse side.

What I claim is:

1. A toggle lock for a holding or toggle bolt comprising, a toggle head tiltable for insertion completely through a hole in a structure and having means to receive said bolt, a guide member having a stop portion with self-spreading arms extending therefrom and carrying said head, and cooperative means between the arms and head for holding or locking the head on the arms close to the hidden or rear surface of the structure to which the toggle is applied after the arms have longitudinally but non-rotatably been moved to holding or locking position, whereby the holding bolt may be removed without operatively disturbing the location of the toggle head for reapplication of a holding bolt.

2. A toggle lock for a holding or toggle bolt comprising, a toggle head tiltable for insertion completely through a hole in a structure and having means to receive said bolt, a guide member having a stop portion with a pair of self-spreading spaced arms extending therefrom carrying said head, the arms having formations for holding the head against the wall of the structure to which it is applied after once having been moved to this position, whereby a holding or toggle bolt may be applied to or removed from the head without operatively disturbing its location, said arm formation being such that the head may be forced by a suitable stud to move the head into a position whereby the entire toggle assembly may be retreived.

3. A toggle lock for a holding or toggle bolt comprising, a toggle head having means to receive said bolt, a guide member having a stop portion with a pair of spaced diverging arms extending therefrom and passing through the head so the head may be turned longitudinally of the arms for insertion through the structure or hole therein, and having bent ends to prevent the head coming off the arms while being so inserted, the arms having considerable resilience so as to force the head back transversely on the arms into contact with the wall of the structure after it has been passed therethrough and to continuously hold the head in position to receive a holding bolt.

4. A toggle lock as set forth in claim 3, further characterized in that the arms may have formations therein for assisting the resilience of the arms in holding the head in bolt-receiving position.

5. A toggle lock as set forth in claim 3, further characterized in that the arms may have formations therein for assisting the resilience of the arms in holding the head in bolt-receiving position, and further characterized in that means may be removably attached to the head for at least insuring that the head may be moved from its horizontal insertion position to a vertical position and also to assist the arms in moving the head into locking position.

6. A toggle lock including a head member for gripping a hidden surface of a structure to which a device is to be attached by a threaded bolt, the head having means for receiving and holding the bolt, a guide member having a stop portion to engage the front surface of the structure to which the device is to be mounted, with arms extending therefrom and initially slidably supporting the head so it may be tilted on the arms into substantial parallelism with the arms for insertion through the structure or hole therein, and then moved into a transverse position with respect to the arms against said hidden surface, and means incorporated in the arms for continuously holding the toggle head in position to later receive the bolt for holding the said device to the structure.

7. A toggle lock as set forth in claim 6, further characterized in that said stop portion is formed integral with the arms.

8. A toggle lock as set forth in claim 6, further characterized in that said stop portion is formed integral with the arms, and further characterized in that the arms have considerable resilience and are formed to have a spreading action whereby when the head is completely through the structure, the arms move it and the stop portion at once against the opposite sides of the structure, ready to receive the said device and holding bolt or bolts.

9. A toggle lock as set forth in claim 6, further characterized in that said stop portion is formed integral with the arms, and further characterized in that the arms have considerable resilience and are formed to have a spreading action whereby when the head is completely through the structure, the arms move it and the stop portion at once against the opposite sides of the structure, ready to receive the said device and holding bolt or bolts, the arms having formations thereon to further insure that the head is held in locking position.

10. A toggle lock as set forth in claim 6, further characterized in that a long assembly bolt having at least a threaded end may be first screwed into the head for moving it on the guide member into operative position in the structure on which the said device is to be mounted, the assembly bolt then being withdrawn for reception of the holding bolt.

11. A toggle lock for a holding bolt comprising a head and a guide and support member having a stop portion and resilient arms extending therefrom for carrying the toggle head having a hole to receive the holding bolt, the arms having formations such that they will hold the head securely against the wall of a support structure after having been moved thereagainst.

12. A toggle lock including a head adapted to receive a holding bolt and a guide and support member tiltably carrying the head whereby the head may be inserted all the way through a hole in a structure to which the toggle is to be applied, the guide and support member having stop means, and further means for holding the head in a locking operative position on a support structure after it has been installed.

13. A toggle lock for a holding bolt comprising a head and a guide-and-support member having a stop portion with integral arms extending therefrom for carrying the toggle head having a hole to receive the holding bolt, said stop portion being formed so as to maintain tension on said arms to accentuate the return movement of the toggle head against the wall of a support structure after having been moved therethrough.

ALFRED W. GELPCKE.